(12) United States Patent
Tiller et al.

(10) Patent No.: US 7,299,895 B2
(45) Date of Patent: Nov. 27, 2007

(54) ENGINE CRANKCASE

(75) Inventors: Timothy T. Tiller, Blue River, WI (US); David Roethel, La Farge, WI (US)

(73) Assignee: S & S Cycle, Inc., Viola, WI (US)

( * ) Notice: Subject to any disclaimer, the term of this patent is extended or adjusted under 35 U.S.C. 154(b) by 158 days.

(21) Appl. No.: 10/368,283

(22) Filed: Feb. 14, 2003

(65) Prior Publication Data

US 2004/0159496 A1 Aug. 19, 2004

(51) Int. Cl.
*F01M 1/04* (2006.01)
(52) U.S. Cl. ............... 184/6.5; 184/6.28; 123/196 AB; 74/606 R
(58) Field of Classification Search .............. 184/6.12, 184/6.13, 6.5, 6.28, 106; 180/219, 374; 123/196 AB; 74/606 R
See application file for complete search history.

(56) References Cited

U.S. PATENT DOCUMENTS

| | | | | |
|---|---|---|---|---|
| 4,356,889 | A | * | 11/1982 | Teeter ...................... 184/6.12 |
| 5,390,634 | A | | 2/1995 | Walters et al. |
| 5,988,344 | A | * | 11/1999 | Allen ......................... 192/216 |
| 6,047,667 | A | | 4/2000 | Leppanen et al. |
| 6,085,855 | A | | 7/2000 | Schanz et al. |
| 6,116,205 | A | | 9/2000 | Troxler et al. |
| 6,189,655 | B1 | * | 2/2001 | Scheib et al. ............... 184/6.12 |
| 6,227,333 | B1 | * | 5/2001 | Scheib et al. ............... 184/6.22 |
| 6,241,040 | B1 | | 6/2001 | Schanz et al. |
| 6,296,071 | B1 | | 10/2001 | Runte et al. |
| 6,345,613 | B1 | | 2/2002 | Hoffmann et al. |
| D463,451 | S | | 9/2002 | Wangen |
| D463,801 | S | | 10/2002 | Kinsey et al. |
| 6,520,293 | B1 | * | 2/2003 | Ogawa et al. ............... 184/6.22 |
| 6,708,652 | B2 | * | 3/2004 | Oki .............................. 123/41.49 |
| 2004/0244735 | A1 | * | 12/2004 | Takeuchi .................... 123/41.57 |

OTHER PUBLICATIONS

S&S Cycle Catalog No. 13, Long Block Engines, pp. 1-1 through 1-20, Feb. 2002.
S&S Cycle Catalog No. 13, Lower End, pp. 6-1 through 6-15, Feb. 2002.

* cited by examiner

*Primary Examiner*—David M. Fenstermacher
(74) *Attorney, Agent, or Firm*—Steptoe & Johnson

(57) ABSTRACT

An engine crankcase and transmission assembly includes a transmission housing including a forward mounting portion and a crankcase including a rear-mounting portion configured for mounting to the transmission. The rear-mounting portion of the crankcase includes an upper section and a lower section spaced apart from the upper section so that the first transmission housing and the crankcase define a passage there between when mounted. An oil sump at a lower portion of the crankcase including an expanded section with an outer surface extending rearward beyond the rear mounting portion of the crankcase. An adapter provides for mounting to a second transmission housing. The crankcase receives interchangeable first and second oil routing devices with oil line fittings for receiving complementary oil lines. The first oil routing device includes first oil line fittings for receiving first oil lines extending toward oil fittings on the first transmission housing, and second oil routing device includes oil line fittings for receiving second oil lines extending toward oil fittings on the second transmission housing.

28 Claims, 11 Drawing Sheets

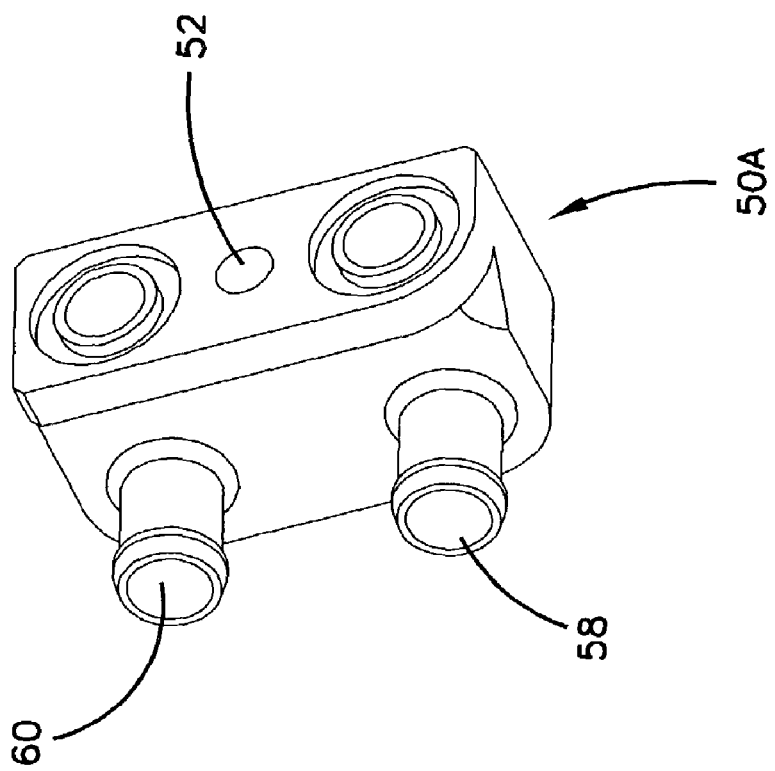
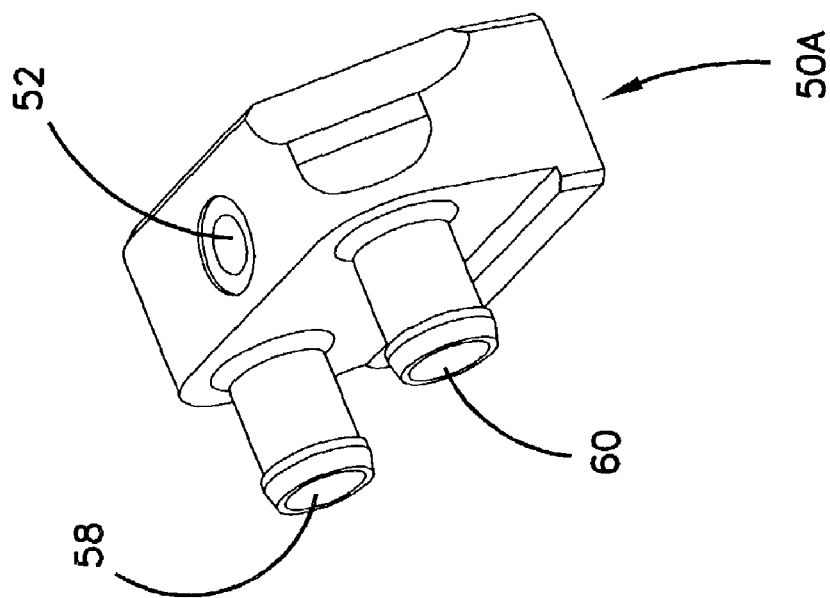

ENGINE CRANKCASE

BACKGROUND OF THE INVENTION

1. Field of the Invention

The present invention is directed to an engine drive assembly, and in particular, to a motorcycle drive assembly crankcase having increased volume and adaptability to mount to different transmissions and to route oil lines differently so as to correspond to the paths required for the transmission.

2. Prior Art

A drive assembly that includes an engine providing power and a transmission providing torque and speed adjustment to the rear wheel, which powers motorcycles. Motorcycle engines typically include a crankcase upon which is mounted the cylinders and the pistons as well as housing the flywheel and supporting the crankshaft as part of a crankcase assembly. The crankcase also defines a camchest housing the engine cams.

The crankcase assembly mounts at its rear to a transmission case or housing and provides drive to the rear wheel through the crankshaft driving a belt, chain or drive shaft. Mounting between the crankcase and the transmission case may have several configurations. In one common configuration, the transmission and the crankcase mount together with generally horizontal pads that overlap one another at the rear of the crankcase and front of the transmission case. More recently, the crankcase and transmission are configured wherein the crankcase and transmission housing mount along a generally vertical interface that lessens the tendency of the transmission and crankcase to slide relative to one another.

In addition to powering the drive train, the crankcase may provide circulation of lubricants to an oil reservoir with an oil pump mounted to the crankcase. Prior drive assembly designs that utilize a vertical interface defined a cavity at one side and utilized oil hoses extending from the crankcase into the cavity and coupling to the transmission for circulation to and from the oil reservoir. The cavity was needed to provide sufficient space for routing of such hoses, but needed a cover to protect the oil lines. However, these oil lines require a preformed right angle bend, are expensive and difficult to install. The transmission housing of other drive assemblies includes an associated oil reservoir, often mounted at the bottom of the transmission housing. This configuration required long hoses or a complicated routing system through the transmission housing itself, requiring special machining. Still other designs include remote oil reservoirs and some may utilize portions of the motorcycle frame as a reservoir.

The engines and transmissions of the prior art are dedicated so that the transmissions and engines of one system cannot be interchanged with those of another having a different style. As motorcycles often have performance modifications made to them, a dedicated mounting arrangement is a disadvantage to those who wish to improve the performance of their motorcycle and upgrade either their engine and/or their transmission, as the choices are limited by the mounting interface. Heretofore, it has not been possible to easily mix and match transmissions and crankcases.

It can be seen that a new and improved motorcycle drive assembly is needed. Such a drive assembly includes a crankcase that should provide for mounting to transmissions having different mounting interfaces. In addition, such engines should minimize the outer cavities that are formed in the crankcase found in the prior art and increase the volume of the camchest portion of the casing. Moreover, such a crankcase should provide fittings and routing so that oil may be routed easily to reservoirs for different style transmissions with different mounting interfaces. Such a crankcase should also provide for improved air-cooling with more air circulation between the transmission and the engine crankcase. The present invention addresses these as well as other problems associated with motorcycle drive assemblies.

SUMMARY OF THE INVENTION

The present invention is directed to an engine drive assembly, and in particular, to a motorcycle drive assembly with an engine crankcase having increased volume and flexibility for mounting with different style transmissions that is not provided for by the prior art.

The crankcase receives two cylinder and piston sets configured for driving a crankshaft. An oil pump typically mounts to the crankcase and provides lubricating oil to the engine. The camchest portion of the crankcase of the present invention includes a housing with an enlarged rear portion providing greater volume over previous motorcycle crankcases. The rear wall of the crankcase extends rearward beyond the mounting portion that mates with a complementary transmission and creates a larger interior volume. With this configuration, the volume of the camchest is increased. Moreover, space wasted by a cavity formed on the crankcase exterior in the prior art is eliminated.

In addition to greater volume due to repositioning of the camchest portion of the crankcase, the transmission to crankcase mounting is improved for better cooling and for greater flexibility. The mounting portion of the crankcase has two horizontally extending portions that mate with corresponding portions of the transmission. Boltholes near the ends of each of the lateral ends of each horizontal mounting portion align with and mate to the transmission for attachment. The section between the mounting portions provides increased exposed surface area and improved cooling characteristics. In addition, the crankcase of the present invention is suitable for receiving an adapter for mounting to transmissions having a substantially horizontal mounting face. With this configuration, the crankcase of the present invention is mountable to different types of transmissions having different style mounts.

Although it is possible to change the mount to attach a crankcase to different transmission housings having different oil reservoirs at different locations, further adaptations are necessary to accommodate the various transmissions in a compatible manner. In addition to different mounting, the locations for oil flow to different oil reservoirs may be substantially different. The present invention utilizes a rear section of the camchest portion of the crankcase for connecting to oil lines. An oil routing device extending rearward provides fittings for routing interchangeable oil lines in different directions to carry oil to different reservoir locations as needed on different style transmissions for different model motorcycles to which the crankcase may be mounted. For example, on some transmissions, the oil is directed into the front of the transmission housing and then through to the oil reservoir, while on other transmissions, oil is routed to the top. In other configurations, oil lines lead to a separate remote oil reservoir. In this manner, flexibility is achieved so that oil can be routed more directly rearward, inward, downward or another required orientation to mate with a corresponding transmission housing oil fitting.

These features of novelty and various other advantages, which characterize the invention, are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views:

FIG. 9 is a perspective view of a first embodiment of an oil routing device for the engine crankcase of FIG. 1;

FIG. 10 is second perspective view of the oil routing device of FIG. 9;

DETAILED DESCRIPTION OF THE PREFERRED EMBODIMENT

Figure 1:
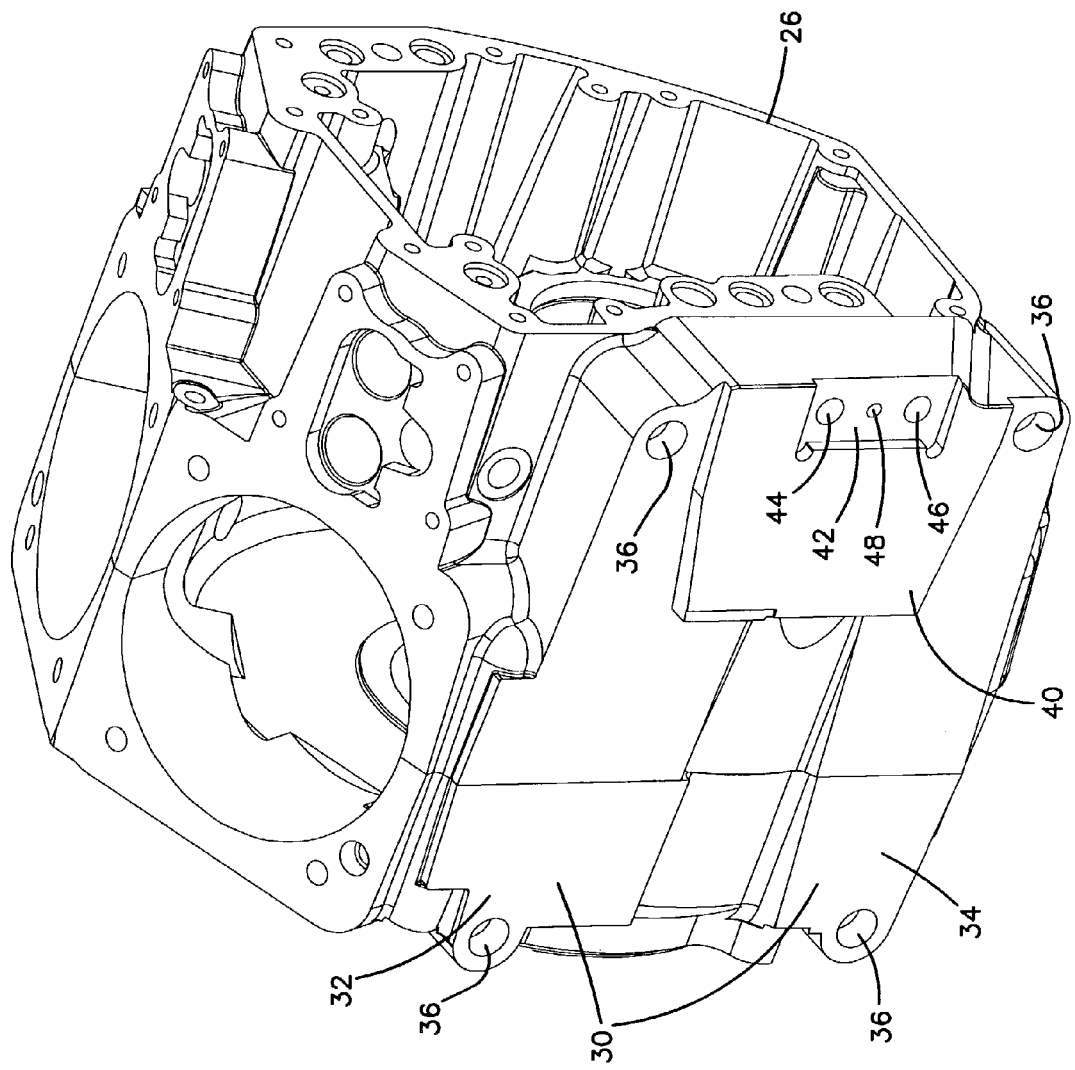
FIG. 1 is a perspective view of an engine crankcase according to the principles of the present invention.
Figure 2:
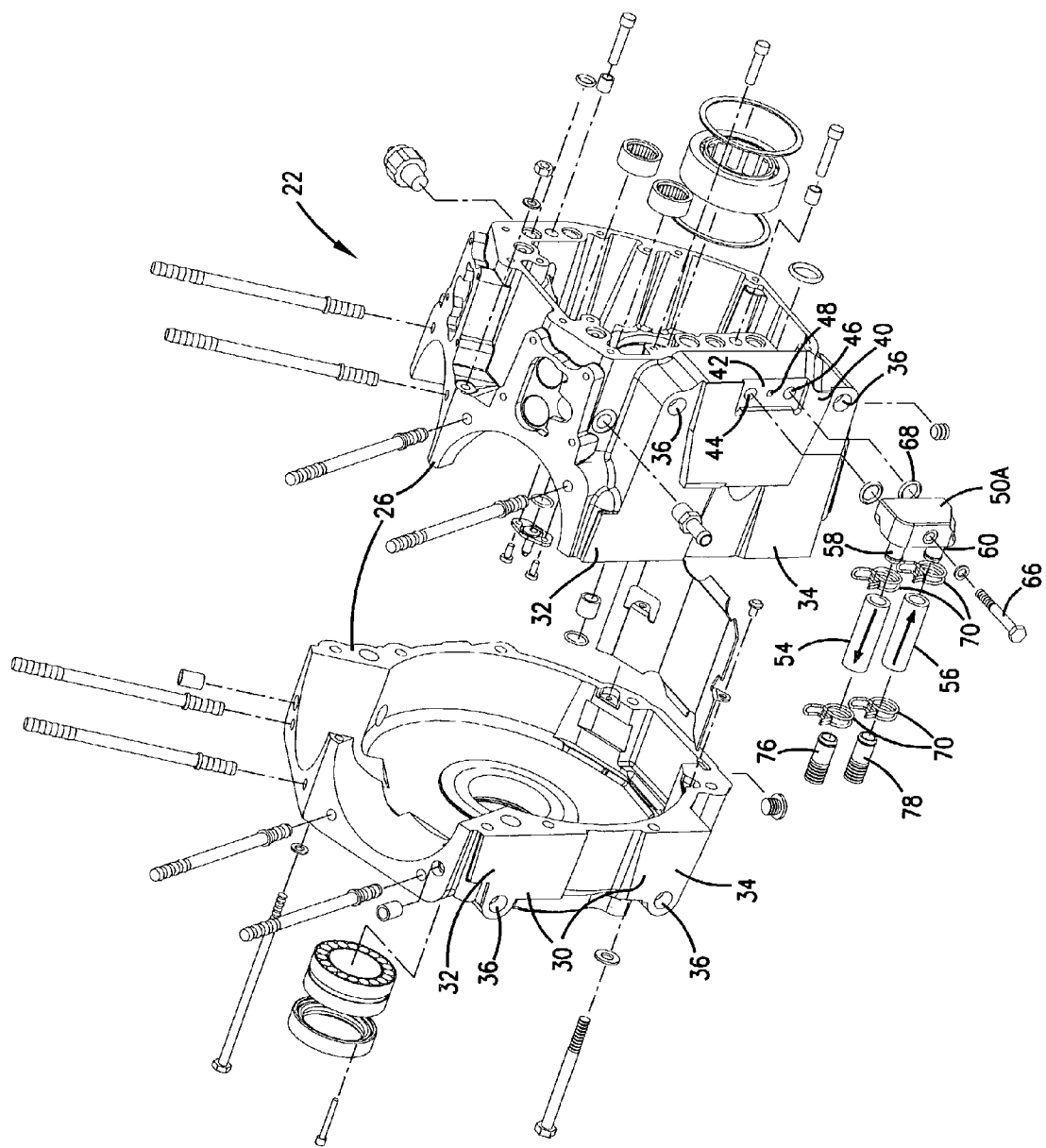
FIG. 2 is an exploded perspective view of a crankcase assembly for the crankcase shown in FIG. 1.
Figure 3:
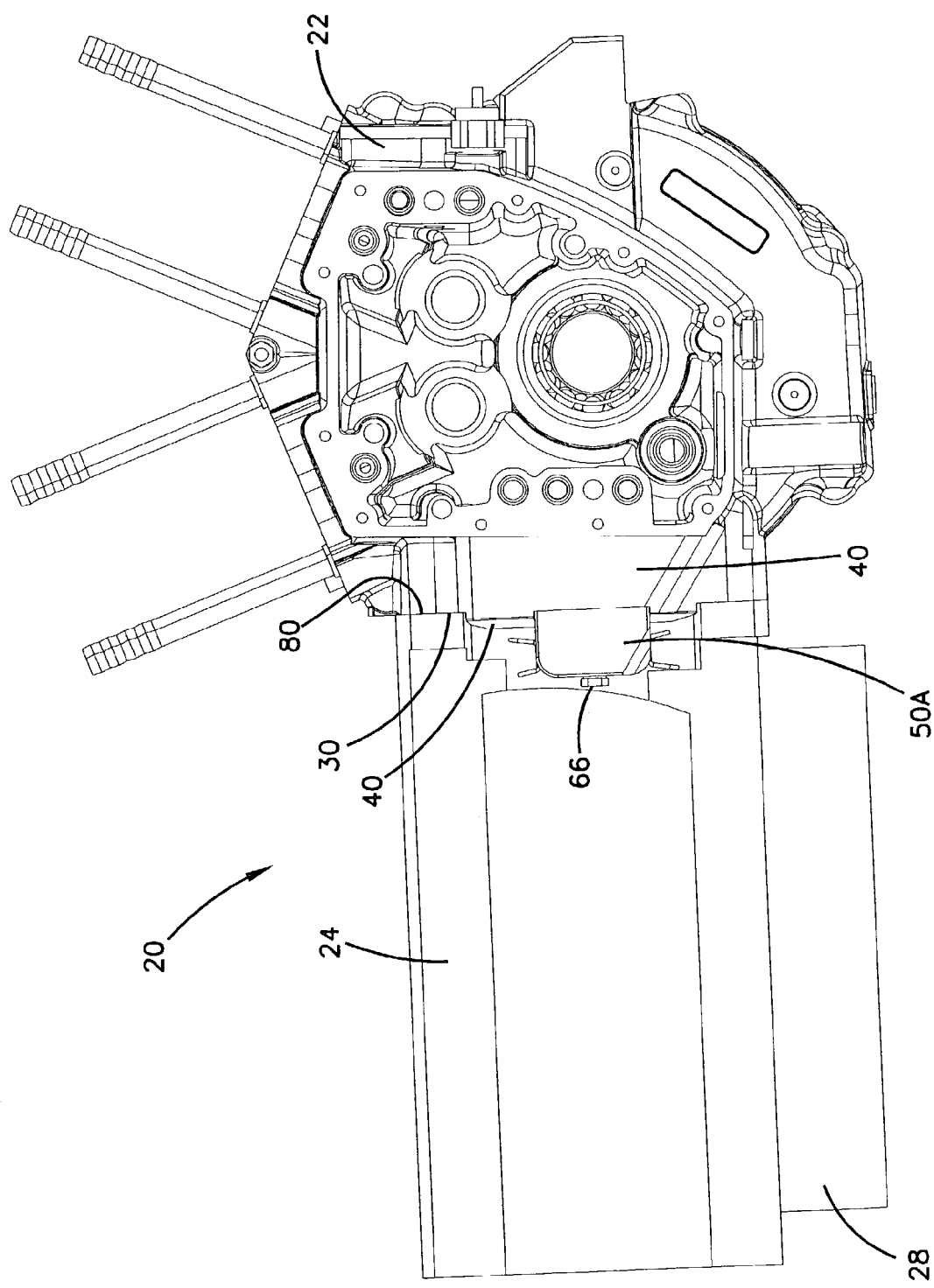
FIG. 3 is a side elevational view of the engine crankcase of FIG. 1 mounted to a first transmission.
Figure 4:
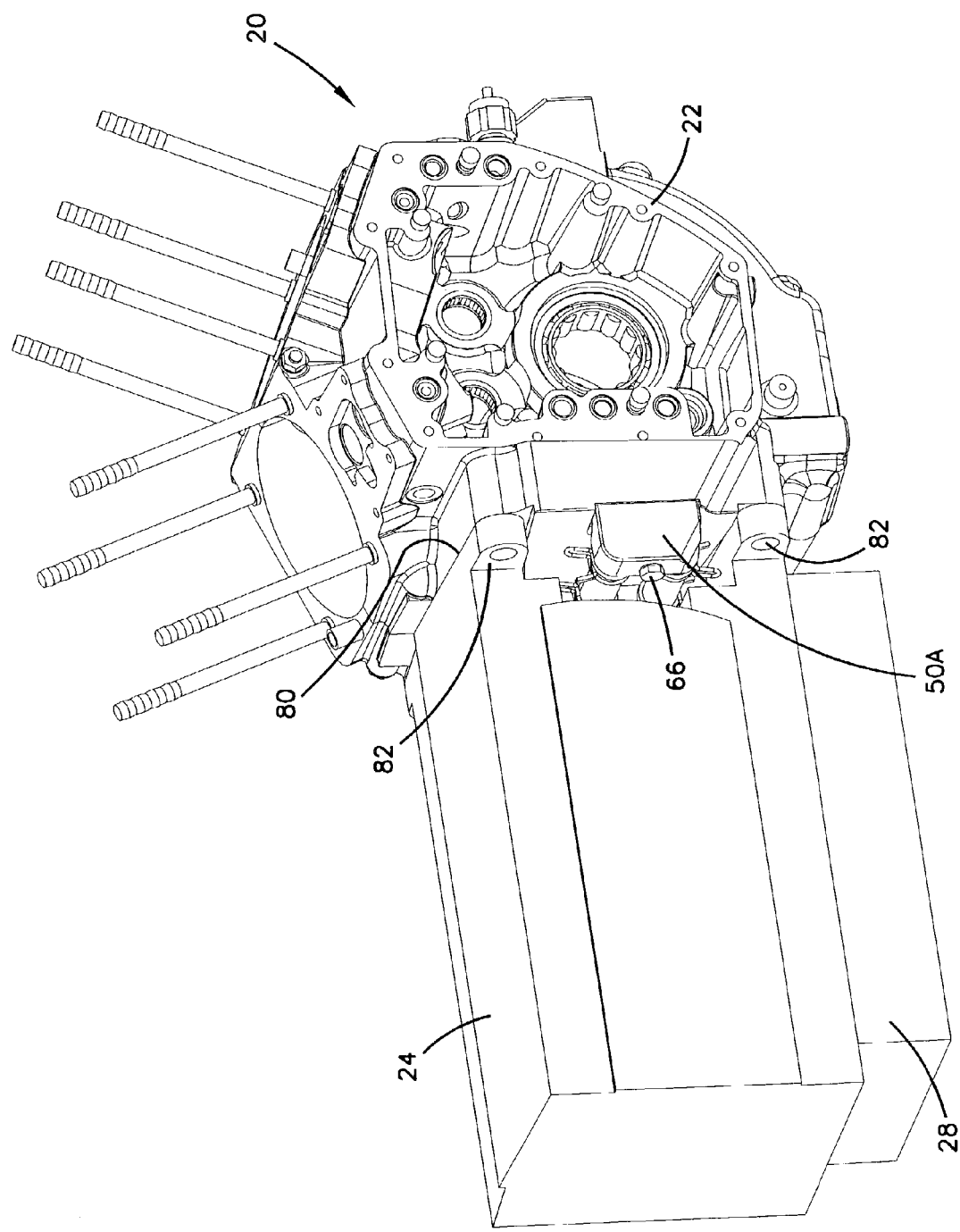
FIG. 4 is a perspective view of the engine crankcase and transmission of FIG. 3.

Referring now to the drawings, and in particular to FIG. 1, there is shown a crankcase 26 mountable to a transmission, according to the principles of the present invention. The crankcase 26 is part of a crankcase assembly 22 as shown in FIG. 2, which mounts to a first embodiment of a transmission housing 24 to form a crankcase and transmission assembly, generally designated 20, as shown in FIGS. 3 and 4.

Referring again to FIGS. 1 and 2, the rear of the crankcase 26 forms a transmission mount 30. The transmission mount 30 includes an upper section 32 spaced apart and separated from a lower section 34. Threaded boltholes 36 receive mounting bolts that extend to complementary mounting holes in the transmission housing 24 that align with boltholes 36. The crankcase 26 receives two cylinders and pistons angled to give the engine a characteristic "V" profile. The crankshaft (not shown) extends out one side of the crankcase 26 and drives a belt, chain or shaft, depending on the motorcycle model. Cylinders and cylinder heads mount to the top of the crankcase 26 and receive the pistons, as is well known in the art. The rear of the crankcase 26 also includes an expanded portion 40 forming a block with an exterior jutting rearward beyond the plane of the faces of the upper and lower mounting sections 32 and 34. The expanded portion 40 provides for increased volume for an oil sump of the camchest portion of the crankcase 26 as well as interchangeably mounting to various transmission configurations, as explained hereinafter. The crankcase expanded portion 40 also includes an attachment portion 42 for receiving interchangeable oil routing devices for different transmissions, as explained hereinafter. The attachment portion 42 includes ducts 44 and 46 for conveying oil to and from the crankcase 26 as well as a mounting hole 48, which is typically threaded for receiving a mounting bolt.

As shown in FIGS. 2 and 9-13, the crankcase assembly 22 receives interchangeable oil routing devices 50A, 50B, and 50C providing multiple oil fitting configurations for receiving oil lines routing to various locations as needed for different transmission and oil reservoir configurations. The oil routing devices 50A, 50B, and 50C connect to the mounting portion 42 of the rear expanded portion 40 of the crankcase 26. Each of the oil routing devices 50A, 50B, and 50C includes a mounting orifice 52 receiving a mounting bolt 66 that inserts in mounting hole 48. Gaskets or O-rings 68 fit onto the mounting surface with first and second oil lines 54 and 56 connecting through the oil routing device 50A, 50B, or 50C to the ducts 44 and 46 on the crankcase 26. The oil line 56 is a delivery line transporting oil from oil reservoir 28, shown in FIGS. 3 and 4, to the crankcase 26 and the oil line 54 is a return line to the oil reservoir 28. In a first configuration shown in FIGS. 2, 9 and 10, the routing device 50A includes an oil line fitting 58 receiving the return line 54 and a fitting 60 for the delivery line 56. The fittings 58 and 60 extend laterally inward from the oil routing device 50A when mounted to the crankcase 26. It can be appreciated that with this configuration, oil lines that have a sharp, pre-formed right angle bend are not required, as was needed with the prior art. Moreover, the oil lines 54 and 56 are protected from damage by the oil routing device 50A that extends outward beyond the rear face of the crankcase 26.

As explained hereinafter and as shown in FIGS. 5-8, in some configurations, oil lines will not extend laterally inward, but will extend substantially horizontally rearward from the oil routing device. In such configurations, the second embodiment of an oil routing device 50B shown in FIGS. 11 and 12 includes a first oil line fitting 62 and second oil line fitting 64 extending rearward, rather than the fittings 58 and 60 shown in FIGS. 9 and 10. The oil line fittings 58, 60, 62 and 64 may be machined as part of the routing device or may be threadable connected.

Figure 13:
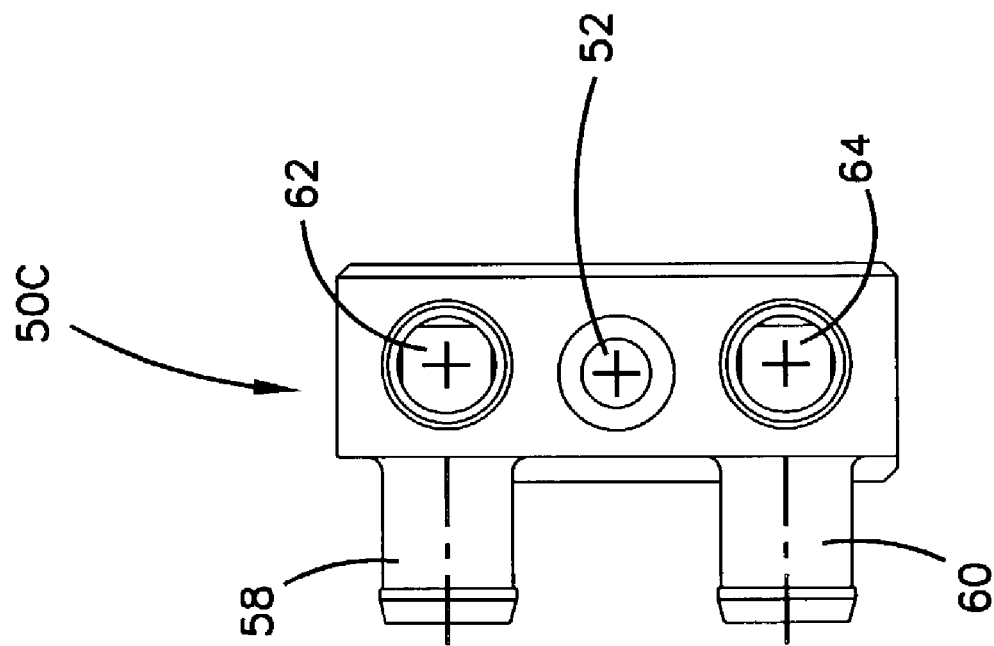
FIG. 13 is a side elevational view of a third embodiment of an oil routing device for the engine crankcase of FIG. 1.

Referring to FIG. 13, there is shown the third embodiment of an oil routing device 50C. The oil routing device 50C is similar to oil routing devices 50A and 50B, but includes both sets of oil line fittings 58 and 60, and 62 and 64. The pair of oil line fittings that is not used on the oil routing device 50C may be blocked off so that only the other pair is open and used. Moreover, it can be appreciated that in some configurations wherein the delivery and return oil lines are oriented in different directions, one fitting of each pair 58 and 60 or 62 and 64 may be used. The oil routing devices 50A, 50B, and 50C interchangeably mount to the attachment portion 42 on the crankcase 26. The oil routing devices 50A, 50B, and 50C move the mounting position for any oil line away from the crankcase assembly 22, eliminate an initial preformed bend, and provide for easier connection and mounting than is possible with the prior art.

Referring again to FIGS. 2, 3 and 4, the return and delivery oil lines 54 and 56 mount to the oil routing device 50A (or 50C) on fittings 58 and 60 respectively. Hose clamps 70 hold the oil lines 54 and 56 in place on the fittings 58 and 60. The transmission 24 includes threaded portions receiving fittings 76 and 78 to route oil through the transmission housing to the oil reservoir 28 at the bottom of the transmission 24. The hose clamps 70 retain the oil lines 54 and 56 on the fittings 76 and 78.

Referring now to FIGS. 3 and 4, it can be appreciated that with the configuration of the present invention, the oil lines 54 and 56 are routed directly from their connection to the crankcase 26 oriented directly at and aligned with the connection to the transmission housing 24. Moreover, the oil lines 54 and 56 eliminate a preformed bend, as had been required with the prior art. The need for a cover is also eliminated. As the oil lines 54 and 56 do not need a permanent bend, it is also possible to use different, less expensive materials for the hoses. This oil routing configuration provides for easy assembly and repair.

The transmission housing 24 includes an I-shaped forward mounting portion 80. Boltholes 82 in lateral top and bottom portions align with the holes 36 in the crankcase 26 to directly mount the transmission 24 to the crankcase assembly 22. When mounted, greater space is formed between the crankcase assembly 22 and the transmission 24. This configuration provides greater airflow and surface area that improve cooling.

Figure 5:
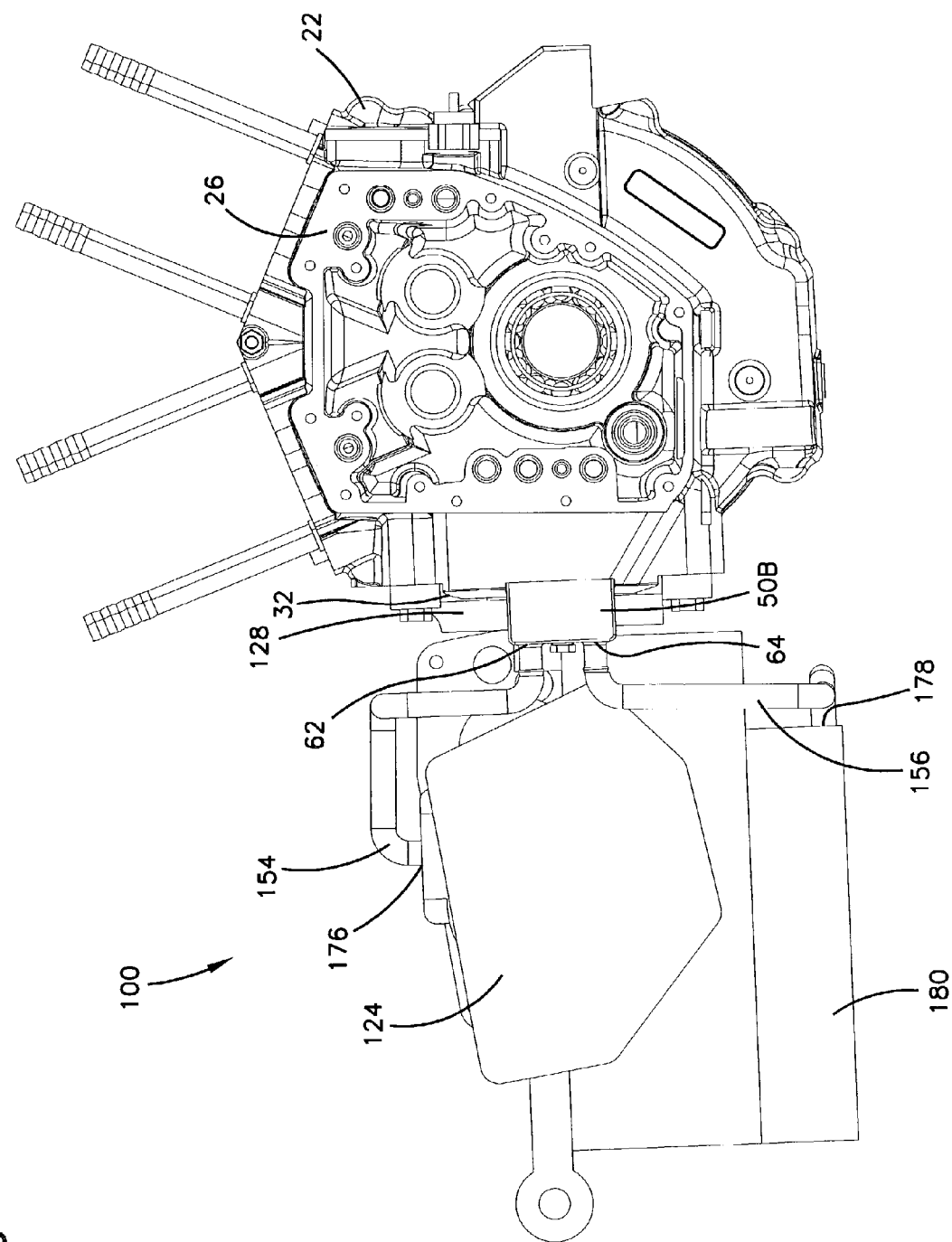
FIG. 5 is a side elevational view of the engine crankcase of FIG. 1 mounted to a second transmission.
Figure 6:
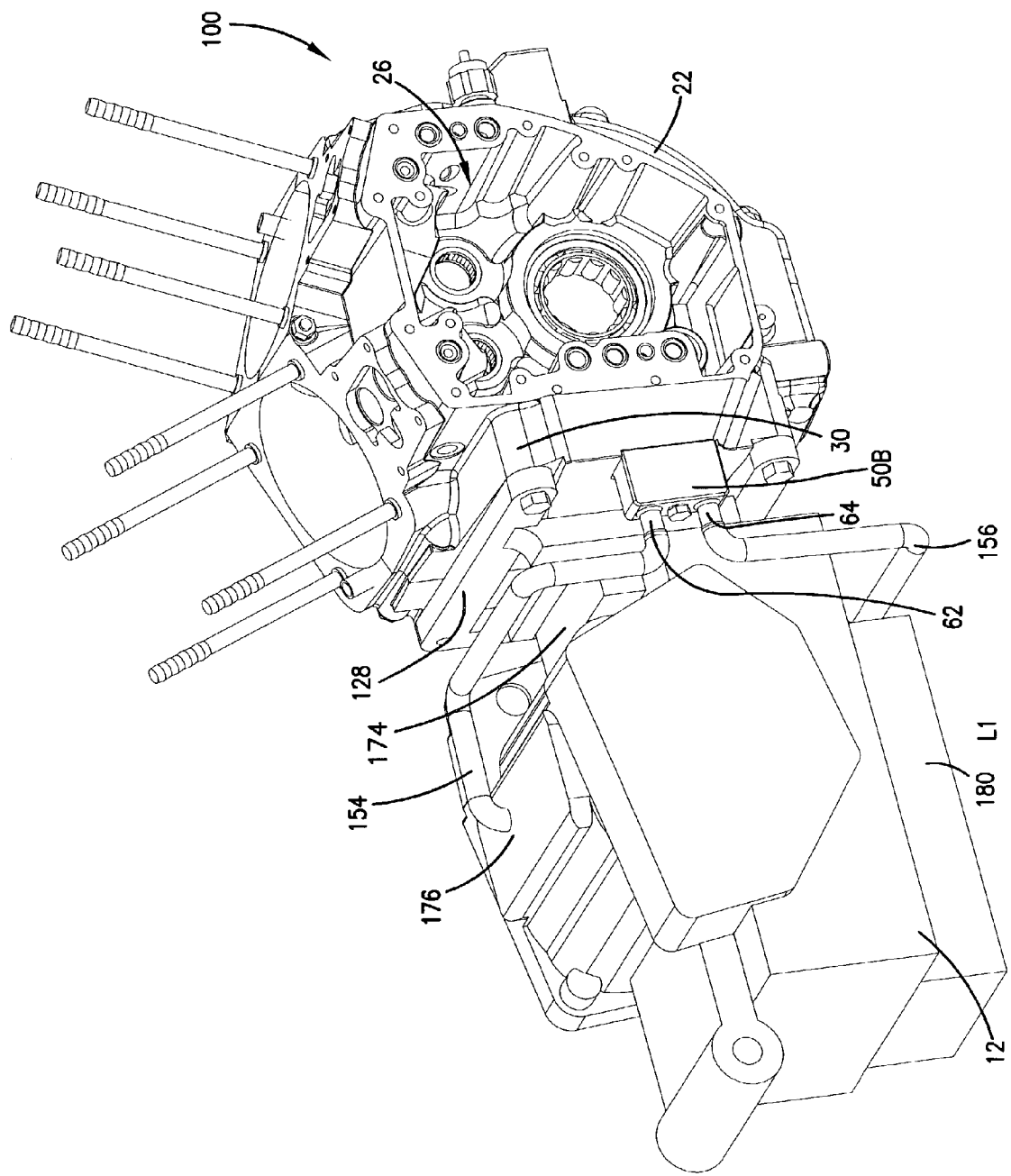
FIG. 6 is a perspective view of the engine crankcase and transmission of FIG. 5.

Referring now to FIGS. 5 and 6, there is shown a second embodiment of a drive assembly, generally designated 100. The drive assembly 100 includes the crankcase assembly 22 shown in FIGS. 1 and 2, and a second embodiment of a transmission 124, which includes a different style forward mount 174, as shown in FIG. 6. An adapter 128 is utilized to mate to the rear transmission mount 30 of the crankcase 26. The adapter 128 includes a first mounting surface configured for mounting to the mounting portion 30 and a second mounting surface configured for mounting to the mounting portion of the transmission 124. For some style motorcycles, an adapter may also be configured for mounting to the frame of the motorcycle. The transmission 124 includes an oil reservoir 180 on an underside of the transmission housing and an oil port at the top of the transmission housing 124. As the transmission housing 124 does not require lateral oil line connections near the crankcase 26, the oil routing device 50B (or 50C) on the crankcase 26 includes fittings 62 and 64 that extend rearward from the routing device 50B. A return oil line 154 and a delivery oil line 156 connect to the fittings 62 and 64. The oil line 154 leads to a fitting 176 at the top of the transmission 124. The oil line 156 leads from a fitting 178 at the lower front of the oil reservoir 180 and connects to the fitting 64. With the transmission 124, the oil lines 154 and 156 are better suited to be directed rearward from the crankcase 26, rather than the fittings 58 and 60 of the routing device 50A, which are directed inward. Therefore, as the routing device 50B includes the oil line fittings 62 and 64 extending rearward, the oil lines 154 and 156 are better oriented initially toward their connection to the transmission 124.

Figure 7:
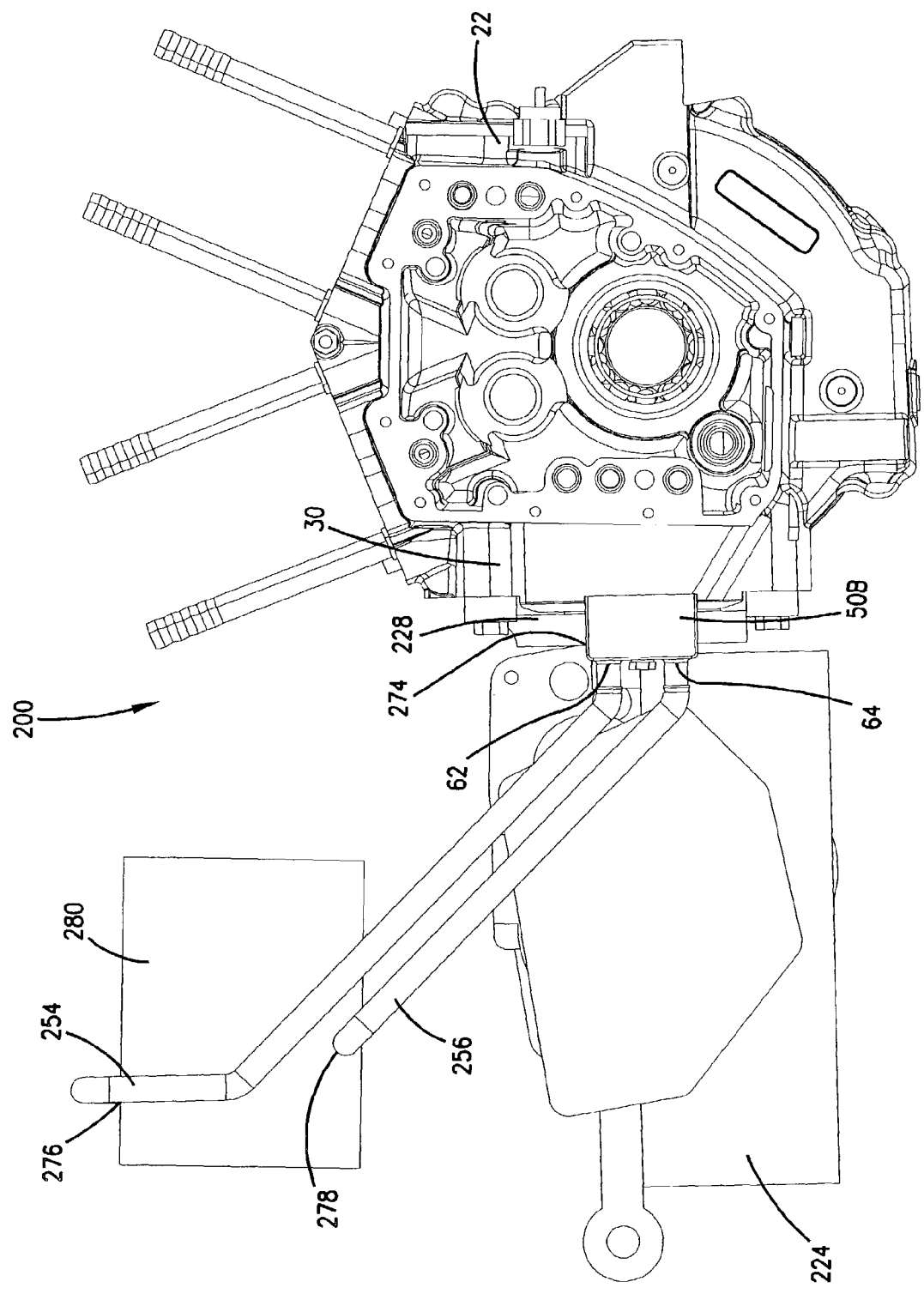
FIG. 7 is a side elevational view of the engine crankcase of FIG. 1 mounted to a third transmission.
Figure 8:
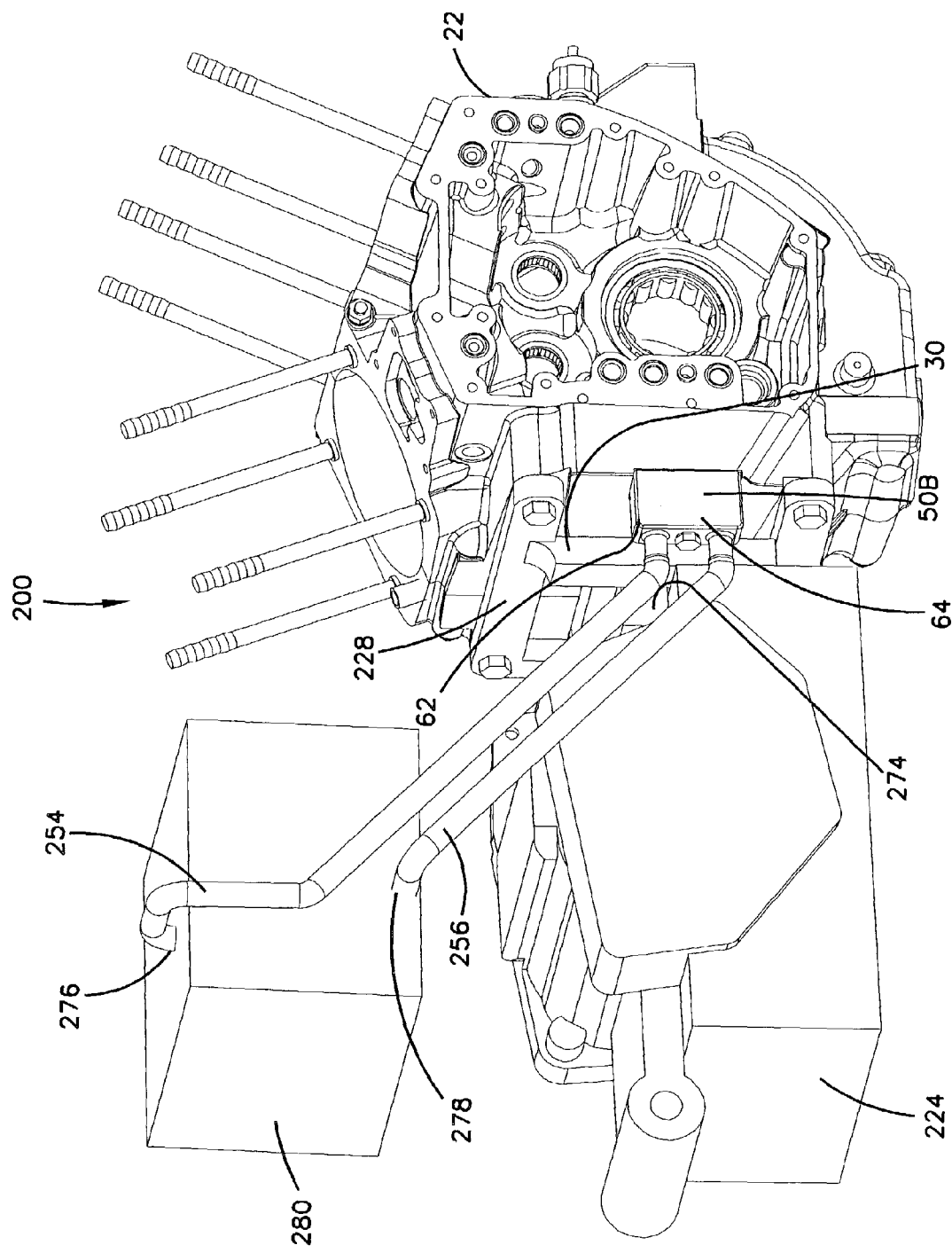
FIG. 8 is a perspective view of the engine crankcase and transmission of FIG. 7.
Figure 12:
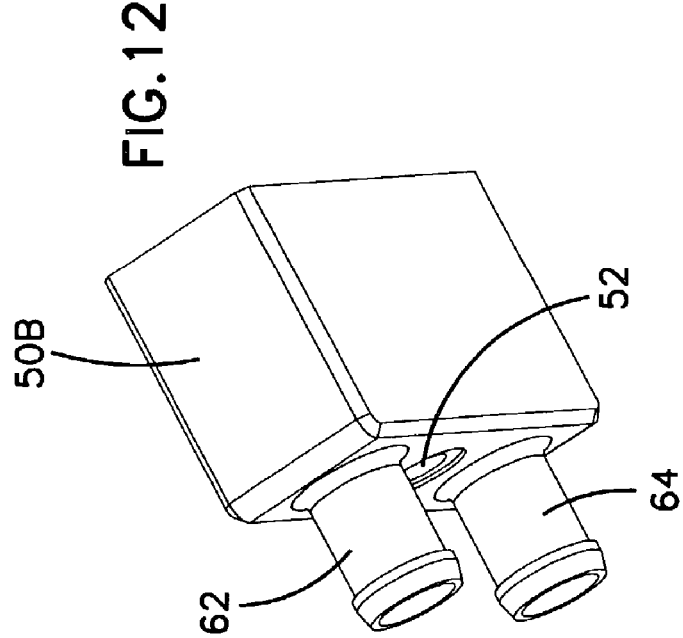
FIGS. 11 and 12 are perspective views of a second embodiment of an oil routing device for the engine crankcase of FIG. 1.
Figure 11:
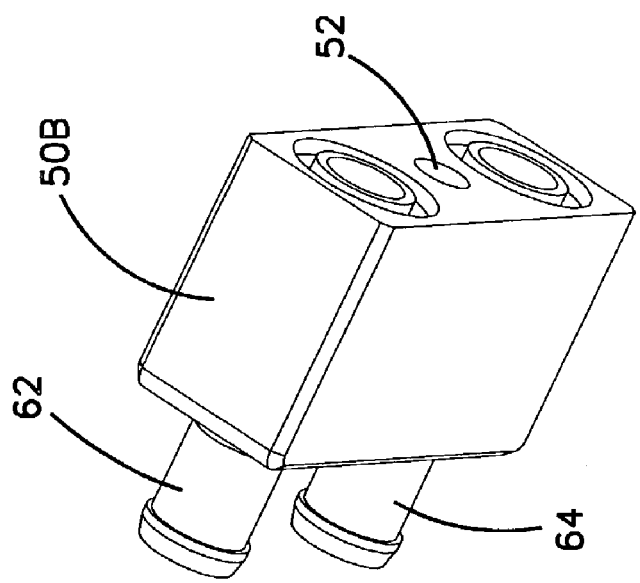

Referring now to FIGS. 7 and 8, there is shown a third embodiment of a drive assembly, generally designated 200. The drive assembly 200 includes the crankcase assembly 22 of FIGS. 1 and 2 mounted to a transmission 224. The drive assembly 200 includes a separate oil reservoir 280. For the embodiment shown in FIG. 7, the transmission 224 includes transmission mounts 274 that mount to an adapter 228 at the front of the transmission 224 in a manner similar to that shown in FIGS. 5 and 6. The adapter 228 connects to the transmission mount 30 at the rear of the crankcase assembly 22 and aligns with the mounting portion 30.

The oil routing device 50B (or 50C) connects to oil lines 254 and 256 through the fittings 62 and 64. The oil lines 254 and 256 lead to oil fittings 276 and 278 that are at the oil reservoir 280 above the transmission housing 224. The return oil line fitting 276 is located at the top of the oil reservoir, while the delivery oil line 256 extends from the bottom of the oil reservoir 280. The oil reservoir 280 provides additional volume for the drive assembly 200.

With the present invention, increased cooling is achieved due to greater airflow between the transmission housings and the crankcase. The embodiment shown in FIGS. 5-8 has a smaller interface with the crankcase than other transmission housings, providing added surface area for greater cooling. In addition, the embodiment shown in FIGS. 3 and 4 provides greater airflow and improved cooling over the prior art. In all embodiments, more direct oil routing and improved cooling are achieved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An engine crankcase assembly, comprising:
   a transmission mounting portion configured for mounting to a transmission housing;
   an attachment portion configured for receiving an oil routing device, said attachment portion including a first duct for routing oil in a first direction and a second duct for routing oil in a second direction; and
   the oil routing device,
   wherein oil lines may be fluidly coupled to said ducts via said oil routing device without substantial bending in said oil lines when said oil routing device is received by said attachment portion.

2. A crankcase assembly according to claim 1, wherein the transmission mounting portion is couplable to the transmission housing via an adapter.

3. A crankcase assembly according to claim 1, wherein the transmission mounting portion comprises a first section and a second section, the second section being spaced apart from the first section.

4. A crankcase assembly according to claim 1, further comprising:
   an expanded section protruding outward beyond a plane defined by the transmission mounting portion.

5. A crankcase assembly according to claim 4, wherein the attachment portion is provided on the expanded section.

6. A crankcase assembly according to claim 1, wherein the oil routing device includes one of first fittings configured for receiving oil lines associated with a first transmission housing and second fittings configured for receiving oil lines associated with a second transmission housing.

7. A crankcase assembly according to claim 6, wherein the first fittings and the second fittings are at different locations.

8. A crankcase assembly according to claim 6, wherein the first fittings and the second fittings extend in different directions.

9. A crankcase according to claim 1, wherein said oil routing device comprises a body having first pathway for fluidly coupling said first duct to a first oil line and a second pathway for fluidly coupling said second duct to a second oil line.

10. A crankcase and transmission assembly, comprising:
    a crankcase including a transmission mounting portion configured for mounting to a transmission housing; and an attachment portion configured for receiving an oil routing device, said attachment portion including a first duct for routing oil in a first direction and a second duct for routing oil in a second direction;

one of a first transmission housing and a second transmission housing, wherein said first transmission housing is directly mountable to said crankcase, and wherein said second transmission housing is mountable to said crankcase via an adapter; and said oil routing device configured to fluidly couple oil lines to said ducts without substantial bending in said oil lines.

11. A crankcase and transmission assembly according to claim 10, wherein said oil routing device comprises a body having first pathway for fluidly coupling said first duct to a first oil line and a second pathway for fluidly coupling said second duct to a second oil line.

12. A crankcase and transmission assembly according to claim 10, wherein the oil routing device includes one of first fittings configured for receiving oil lines associated with said first transmission housing and second fittings configured for receiving oil lines associated with said second transmission housing, said first fittings and said second fittings being at different locations.

13. A crankcase and transmission assembly according to claim 12, wherein the fittings extend in different directions.

14. A crankcase and transmission assembly according to claim 10, wherein the transmission mounting portion comprises a first section and a second section, the second section being spaced apart from the first section.

15. A crankcase and transmission assembly according to claim 10, wherein said adapter is configured to mount to said transmission mounting portion, said second transmission housing, and an oil reservoir.

16. A crankcase and transmission assembly according to claim 15, wherein said second transmission housing includes said oil reservoir.

17. An engine crankcase and transmission assembly, comprising:

a transmission housing including a forward mounting portion;

a crankcase including a rear mounting portion configured for mounting to the forward mounting portion, the rear mounting portion including an upper section and a lower section spaced apart from the upper section; and an oil sump at a lower portion of the crankcase including an expanded section, the expanded section being defined by at least an outer surface of the crankcase extending rearward beyond a plane defined by the rear mounting portion of the crankcase.

18. An engine crankcase and transmission assembly according to claim 17, wherein the rear mounting portion includes an adapter configured for mounting to the forward mounting portion.

19. An engine crankcase and transmission assembly according to claim 18, wherein the expanded section includes a receiving portion for connecting to an oil routing devices.

20. An engine crankcase and transmission assembly according to claim 18, wherein the expanded section includes a receiving portion for connecting to an oil routing device.

21. An engine crankcase and transmission assembly according to claim 18, wherein the expanded section includes a receiving portion for connecting to interchangeable first and second oil routing devices with oil line fittings for receiving complementary oil lines, wherein the first oil routing device includes first oil line fittings for receiving first oil lines extending toward oil fittings for a first transmission housing, and the second oil routing device includes second oil line fittings for receiving second oil lines extending toward oil fittings for a second transmission housing.

22. An engine crankcase and transmission assembly according to claim 21, wherein the first oil routing device includes first fittings configured for receiving oil lines from the first transmission housing and the second oil routing device includes second fittings configured for receiving oil lines from the second transmission housing.

23. An engine crankcase and transmission assembly according to claim 22, wherein the first fittings and the second fittings extend in different directions.

24. An engine crankcase and transmission assembly according to claim 22, wherein the first fittings and the second fittings are at different locations.

25. A device for routing oil flow between an engine crankcase and a transmission housing, the device comprising:

a body defining a plurality of independent passages including:

an oil delivery passage;

an oil return passage; and a mounting passage;

an engine crankcase mounting surface defining a plurality of orifices including:

an oil delivery orifice in fluid communication with the oil delivery passage of the body;

an oil return orifice in fluid communication with the oil return passage of the body; and a mounting orifice at an end of the mounting passage;

an oil delivery fitting being coupled to the body and in fluid communication with the oil delivery passage; and an oil return fitting being coupled to the body and in fluid communication with the oil return passage.

26. A device according to claim 25, wherein the mounting passage extends linearly through the body along a mounting axis.

27. A device according to claim 26, wherein the oil delivery fitting projects from the body along an oil delivery fitting axis, and the oil return fitting projects from the body along an oil return fitting axis.

28. A device according to claim 27, wherein the oil delivery fitting and the oil return fitting axes lie in a plane that is perpendicular to the mounting axis.

* * * * *